2,972,512

METHOD OF REMOVING HYDROGEN SULPHIDE FROM GASES AND RECOVERING SULPHUR THEREFROM

Henri M. Guinot, Versailles, France, assignor of one-half to Ateliers Pingris & Mollet-Fontaine Reunis (Société Anonyme), Lille, Nord, France, a French company No Drawing. Filed June 3, 1955, Ser. No. 513,151

Claims priority, application France June 16, 1954

6 Claims. (Cl. 23—3)

This invention relates to the desulphuration of gases.

It has already been proposed to remove the hydrogen sulphide from gases obtained by the distillation of coal by washing the gases by means of ferric sulphate solutions, which are capable of oxidising the hydrogen sulphide, with production of sulphur. The ferrous sulphate transitorily obtained may then be re-oxidised and the cycle may be indefinitely repeated.

However, this method, which is apparently so attractive, has not hitherto been industrially applied. This is due to various causes, the principal of which is the difficulty in regenerating the ferrous sulphate to form ferric sulphate. When this regeneration is effected with air or oxygen, it is necessary to raise the temperature of the solution considerably, for example to 140°–160° C., while applying high pressures of the order of from 20 to 150 kg., in order to obtain a satisfactory rate of oxidation from the standpoint of industrial practice. Moreover, since the treatment of the gas for the removal of hydrogen sulphide must be carried out at normal temperature, it will be seen that it is necessary to heat the aqueous ferrous sulphate solution to 140°–160° C. in order to be able to oxidise it, and then it is necessary to cool it in order to effect the desulphurisation of the gas.

This cycle of successive heating and cooling necessitates the use of powerful heat exchangers supplemented by heaters and coolers, which represents considerable capital outlay and a great expenditure of heat.

Moreover, the acid solutions which are formed at high temperature in the presenec of oxygen and oxidation catalysts, are extremely corrosive. The recovery of the sulphur, which must be effected in each cycle before the oxidation phase, also sets difficult problems, especially as the sulphur tends rapidly to foul the walls of the exchangers. It is to be noted that the sulphur precipitated in the desulphurising reaction is insoluble in the usual solvents such as carbon disulphide. For these reasons the failure of this method when industrially applied will be readily understood.

It is an object of the present invention to provide a method of removing hydrogen sulphide from the gases in which it is contained, more especially natural gases, petroleum gases, gases obtained by the distillation of coal, and the like, by the application of reactants capable of being not only employed but also regenerated at the ambient temperature or at slightly higher temperatures, the precipitated sulphur being in a form in which it is soluble in the usual solvents, notably in carbon disulphide in the cold.

According to the present invention a process for the removal of hydrogen sulphide from gases containing the same comprises contacting said gases with an aqueous solution of at least one ferric salt of an organic acid which salt is substantially stable to oxidation at room temperature, is substantially non-corrosive and which has a sufficiently high dissociation coefficient to prevent substantially the precipitation of iron sulphides (which would contaminate the sulphur precipitated in the desulphurisation phase).

Iron salts of acetic acid which are extremely soluble in water, are among the most useful salts from the industrial standpoint. Other examples are the salts of formic acid, propionic acid and butyric acid, soluble double oxalates and the salts of homologous dibasic acids. Mixtures of such salts may also be employed, if desired with an excess of free acids used alone or in admixture for preventing any precipitation of sulphide during the desulphurisation phase.

A method of carrying out the process of the invention will now be described, ferric acetate being referred to as a suitable reagent.

The process is started with an aqueous ferric acetate solution prepared in any appropriate manner, but preferably by double decomposition between calcium acetate and ferric sulphate. Its concentration may correspond, for example, to 0.5 gramme-molecule of ferric acetate per litre. Such a solution is capable of yielding one-half gramme-atom of oxygen to destroy the hydrogen sulphide, with production of sulphur and liberation of acetic acid by the reaction:

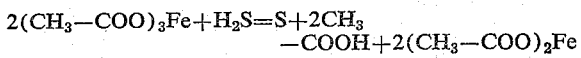

$$2(CH_3-COO)_3Fe + H_2S = S + 2CH_3-COOH + 2(CH_3-COO)_2Fe$$

The solution of acetic acid and ferrous acetate thus obtained contains sulphur in suspension, but this is rapidly deposited. This sulphur is soluble in the usual solvents, more especially in carbon disulphide in the cold. It is therefore possible for the sulphur formed to be quantitatively separated by decanting, filtration or centrifuging or by extraction by means of solvents.

The ferrous acetate solution is very readily oxidisable by means of good agitation in oxygen even at normal temperature and pressure. Thus, at a temperature of 20° C., with oxygen under atmospheric pressure, the degree of oxidation reaches 50% of the theoretical value in 3 hours, its limit being in the neighborhood of 60%. At the same temperature of 20° C. under a pressure of 60 kg./sq. cm. the degree of oxidation reaches 90% of the theoretical value in 6 minutes. The addition of small quantities of manganese acetate, of the order of 1 mol of manganese to 100 mols of iron, accelerates the rate of oxidation. The acetates of copper, cobalt and cerium may also be used as oxidation-catalysts.

When the temperature is slightly raised, for example to 60° C., it is found that the rate of oxidation increases to a large extent, all other conditions remaining the same. Nevertheless, it is preferable, from the industrial standpoint, to avoid temperature changes, it being preferable to use air or oxygen at ordinary temperature but under very high pressure.

Apparatus suitable for carrying out the said process may comprise three essential stations:

(1) A desulphurisation station in which the hydrogen sulphide is destroyed by washing of the gas with a ferric acetate solution.

(2) A station for the recovery of the sulphur by decanting, filtration or centrifuging or by separation by means of solvents.

(3) A station for the re-oxidation of the ferrous liquor by the action of air or oxygen, preferably under pressure, but at normal temperature.

A system of pumps is provided to recirculate the purifying solution between the three stations. It is to be noted that the recovery of the sulphur need not be effected in each cycle. In fact, since the oxidation of the ferrous salt effected in the cold does not adversely affect the sulphur already present in the liquid, it is possible in the new method to allow the sulphur to accumulate in the liquid in circulation and to treat continuously only a fraction of this liquid for the purpose of eliminating the sulfur contained therein. It is also to be noted that some of the sulphur may be deposited by being passed through a reservoir tank serving to contain a supply of reactant for the whole installation.

It may be desirable to provide in the bottom of this reservoir tank a heavy solvent such as carbon disulphide, which dissolves the sulphur which tends to be deposited. It is thus possible to effect a continuous withdrawal of the sulphur solution thus obtained, to separate the solvent by distillation and to return the solvent continuously into the bottom of the reservoir tank. In this way the removal of the sulphur as a continuous operation may be effected.

When it is not desired to allow the sulphur to accumulate in the liquid, but to separate it at each passage through the circuit, precautions to avoid the formation of iron sulphides in the desulphurisation phase are not so important. Indeed, it has in fact been found that these iron sulphides may decompose with formation of sulphur in the oxidation phase by the following reaction:

$$FeS + 2(CH_3COO)_3Fe \rightarrow S + 3(CH_3COO)_2Fe$$

The recovery then necessarily succeeds the oxidation phase and precedes the desulphurisation phase. It is clear that in such cases the ferric solution is capable of combining with a much greater quantity of $H_2S$ in the desulphurising phase.

Conventional apparatus capable of effecting the methodical washing of the gases by means of a liquid may be employed e.g. plate-type and packed columns, emulsifiers or batteries of bubblers capable of bringing the gas to be purified and the washing liquid into intimate contact. The type of apparatus employed is chosen in accordance with the respective rates of flow of the gas and of the liquid, which in turn depend upon the proportion of hydrogen sulphide to be eliminated.

It is preferred to effect the two operations of desulphurisation and oxidation under the same pressure, so that the circulation of the purifying solution in a closed cycle is greatly facilitated. Nevertheless, it is possible within the scope of the present invention to effect an expansion of the liquid between the two operations, with recovery of the energy thus liberated and separation of the sulphur and of the dissolved gases, or to carry out the operation under atmospheric pressure in the case of solutions containing only a small amount of hydrogen sulphide.

The operations of desulphurisation and re-oxidation hereinbefore considered as having to be carried out separately may also be simultaneously effected in a common enclosed space, which obviously results in a simplification. More particularly, this method of operation is very valuable when it is required to treat gases having a high hydrogen sulphide content, because it then avoids the necessity of circulating large volumes of ferric reactant in a closed circuit between the zone for the desulphurisation or reduction of the ferric salt and the zone for the re-oxidation or regeneration of this salt.

Depending upon the method of operation preferably adopted for this embodiment, double injection of gas is simultaneously effected in the zone in which the ferric salt acts, namely that of the gas to be purified and that of the molecular oxygen introduced in a quantity just sufficient to produce the quantitative oxidation of the hydrogen sulphide to be removed, with the assistance of the iron salt or salts.

Under these conditions, sulphur is simultaneously formed in a substantially quantitative yield, an excessive temperature increase due to the heat evolved by the reaction is, however, to be avoided. The sulphur is separated by simple sedimentation, centrifuging or dissolution in a solvent, as described above. It is possible, for example, to effect a continuous extraction of liquid containing sulphur in suspension, to decant it or to separate it by any other similar means, and to return the clarified liquid continuously into the reaction zone.

There are liberated from the zone in which the combined reaction and regeneration take place the inert gases in which the hydrogen sulphide was diluted, together with the residual nitrogen when air has been used as a source of oxygen for the regeneration of the ferric salt.

This method of purification with simultaneous and continuous regeneration of the purifying ferric solution takes place at a satisfactory rate even at normal pressure.

Thus, by operating with an aqueous solution of a mixture of ferric acetate and ferric propionate containing one gram-atom of iron per litre, the following results are obtained:

If 16 cc. of hydrogen sulphide per hour are passed into a tank having a total capacity of 1 cubic metre and containing 500 litres of ferric solution, while maintaining an effective agitation, it is found that the gas is totally absorbed, and this absorption continues indefinitely if care is taken to inject continuously into the liquid of the tank at the same time the corresponding quantity of oxygen, that is to say, about 16/2=8 cubic metres per hour and to cool it so as to maintain the initial temperature, that is to say, a temperature of the order of 25° C. At the same time, the sulphur is precipitated in the liquor in substantially quantitative yield.

It is advantageous to conduct the operation in such manner that the purifying liquor always contains substantially equal proportions of ferric and ferrous iron in order that the two reactions of desulphurisation and oxidation may remain in the neighbourhood of their maximum activity. The maintenance of these conditions may be controlled by the relative rates of introduction of hydrogen sulphide and oxygen and it is easy to correct the balance if it departs substantially from the optimum to such an extent as adversely to affect the progress of the desulphurisation.

When gases under pressure are employed, the overall working rate is increased in proportion with this pressure.

When the hydrogen sulphide content of the gas to be purified is relatively high, which is sometimes the case with some natural petroleum gases, the method of simultaneous desulphurisation and regeneration is preferred. Since the available gas is generally supplied under high pressure, it is first subjected to washing with water in such a quantity as to ensure dissolution of almost all the hydrogen sulphide (and if desired of the carbon dioxide) and of as little as possible of the valuable gases (methane). If, for example, a petroleum gas containing 20% of hydrogen sulphide is available at a pressure of 60 kg./sq. cm. it is known that the equilibrium limit under this pressure corresponds to a solubility of about 36 litres of $H_2S$ per litre of water. Assuming that in industrial practice the solubility is only 20 litres per hour, it will be seen that by using 10 litres of washing water per cubic metre of gas, almost all the hydrogen sulphide should have been removed. Naturally, this result will not be entirely attained since the washing water recovered after decompression and re-used in a closed circuit always contains a quantity of hydrogen sulphide in solution. For effecting a complete purification of the treated gas, it is necessary to subject it to a further treatment by means of a ferric reactant in the manner first described above.

The hydrogen sulphide (which may be accompanied by carbon dioxide, methane or other gases) obtained in the decompression of the washing water, may be subjected to the simplified treatment described above.

Gases of very high hydrogen sulphide content obtained by the conventional methods of gas-purification using ethanolamine solutions (e.g. "Girbotol" process or other similar processes) may be treated in accordance with this invention, the treatment then having, for its principal object, not the purification of the initial gas, but the produc-

I claim:

1. In a continuous process for the removal of hydrogen sulphide from a gaseous mixture containing the same, the steps of contacting said gaseous mixture continuously with an aqueous solution of a ferric salt of a lower aliphatic carboxylic acid, thereby causing hydrogen sulphide to react with said ferric salt with consequent release of said lower aliphatic carboxylic acid in free state and production of sulphur together with corresponding ferrous salt of said lower aliphatic carboxylic acid in said aqueous solution; continuously subjecting the acid aqueous solution thus formed to an oxygen containing gas whereby to regenerate the same by converting said ferrous salt and said lower aliphatic carboxylic acid as set free therein, back to ferric salt of said lower aliphatic carboxylic acid; oxygen containing gas with respect to said gaseous mixture so that the total amount of ferric salt in solution is always in stoichiometric excess with respect to the hydrogen sulfide in said gaseous mixture.

2. The process of claim 1, said ferric salt being selected from the group consisting of ferric acetate and ferric propionate.

3. The process of claim 1, the aqueous solution further containing an amount of said lower aliphatic carboxylic acid in the free state.

4. In a continuous process for the removal of hydrogen sulphide from a gaseous mixture containing the same, the step of simultaneously contacting said gaseous mixture and an oxygen containing gas with an aqueous solution of a lower aliphatic carboxylic acid, ferric salt of the same acid, and ferrous salt of said acid, so as to produce a precipitate of sulphur in said solution from said hydrogen sulphide; controlling the amount of oxygen containing gas in relation to the amount of hydrogen sulphide in said gaseous mixture so as to supply one mole of oxygen per two moles of hydrogen sulphide, thereby simultaneously maintaining the ferric-ferrous balance of the said solution; and separating said sulphur from said solution.

5. The process of claim 4, said ferric salt and ferrous salt being in substantially equimolecular proportion.

6. The process of claim 4, said acid being selected from the group consisting of acetic acid and propionic acid.

References Cited in the file of this patent

UNITED STATES PATENTS

| 1,815,933 | Sperr | July 28, 1931 |
| 2,641,527 | Leutz | June 9, 1953 |

FOREIGN PATENTS

| 10,607 | Great Britain | 1845 |